March 14, 1950  W. S. CATES ET AL  2,500,151
VISUAL HOMING INDICATOR
Filed Sept. 17, 1945  2 Sheets-Sheet 1
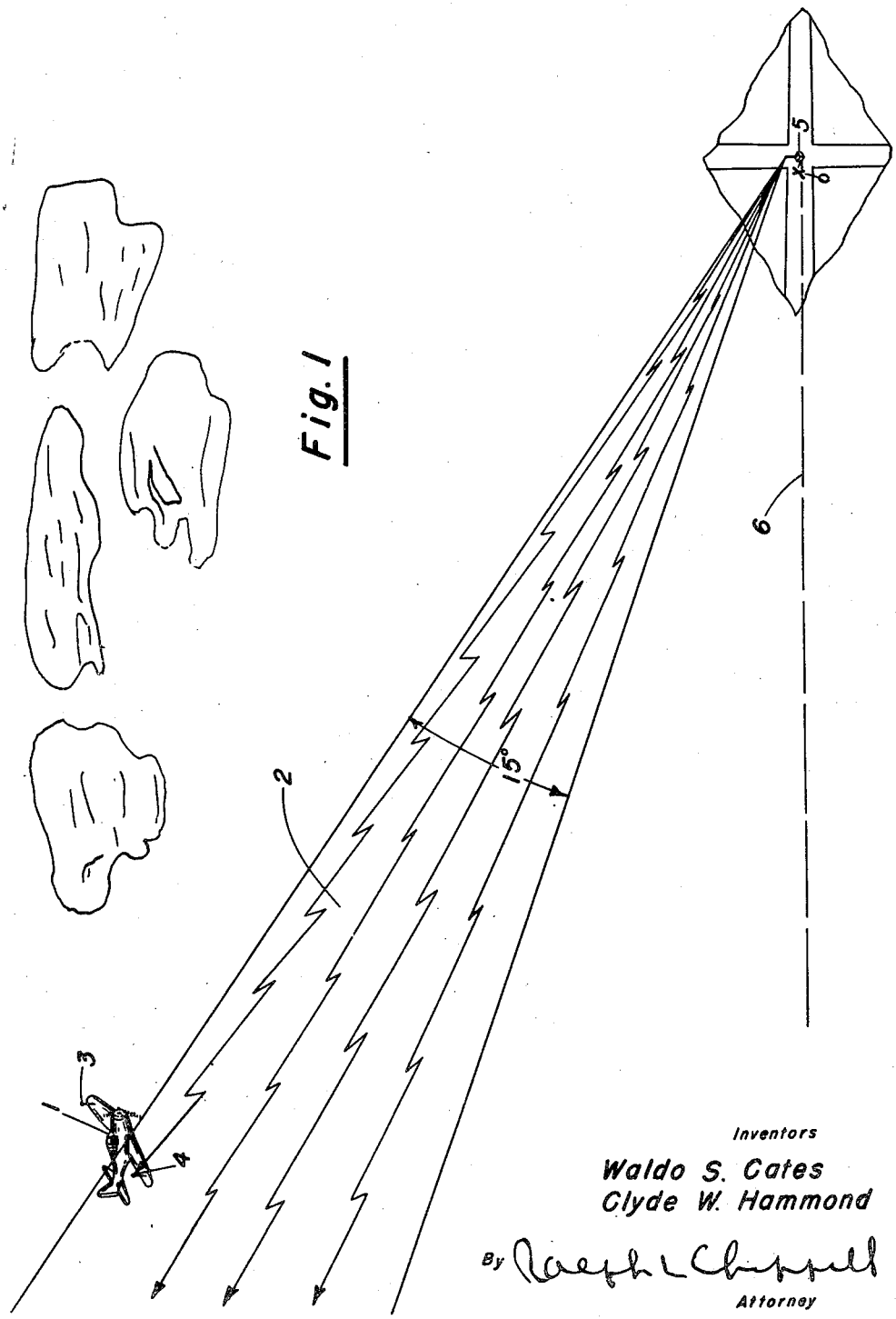
Inventors
Waldo S. Cates
Clyde W. Hammond
By Ralph L. Chappell
Attorney

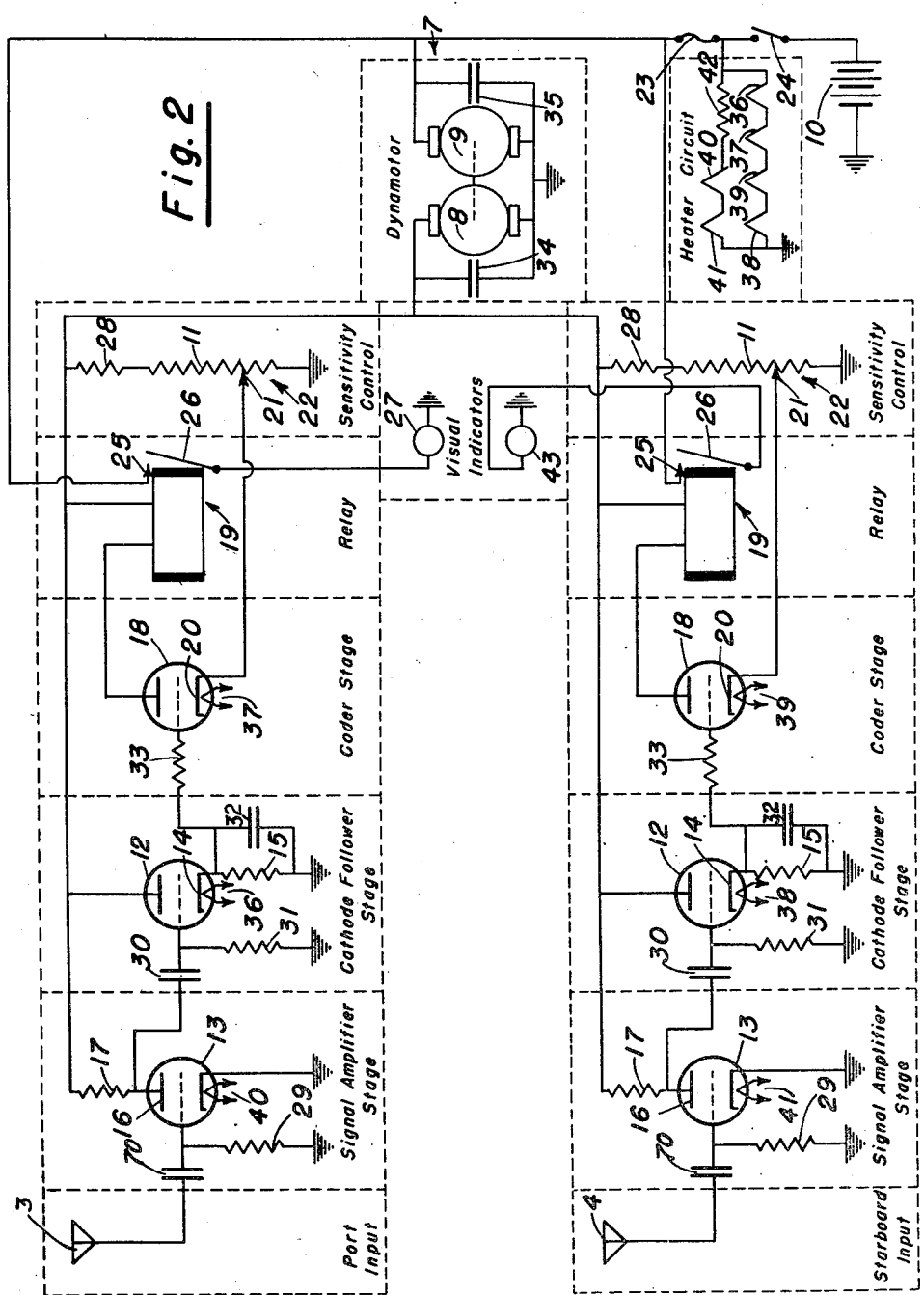

Patented Mar. 14, 1950

2,500,151

UNITED STATES PATENT OFFICE 2,500,151

VISUAL HOMING INDICATOR

Waldo S. Cates and Clyde W. Hammond,
United States Navy

Application September 17, 1945, Serial No. 616,946

4 Claims. (Cl. 343—113)

(Granted under the act of March 3, 1883, as amended April 30, 1928; 370 O. G. 757)

This invention relates generally to homing devices, and more particularly to visual homing indicators.

Our invention furnishes the pilot of an airplane with a "port" and "starboard" visual indication for homing. It may simultaneously provide a visual blinker signal.

Receiving antennae are provided as far out as possible on the wing tips of an airplane. Reception of radiant beam energy on the port antenna of a plane will flash a red port indicator lamp; and reception by the starboard antenna will flash a green starboard indicator lamp. This apprises the pilot of the direction he must bank to center on the beam. When crossing a homing beam signal, the indicators will glow, thus informing the pilot that he has crossed the signal beam and on which side it originated. Any code transmitted on the beam will be reproduced in blinker form on the indicator lamps.

The principal object of our invention is to provide means that will visually indicate to a pilot whether he is sliding off to the port, starboard, or centered on a homing beam.

Another object of our invention is to provide means which will visually indicate code transmitted on a homing beam.

For a more complete understanding of the invention and for other objects and advantages thereof, reference should now be had to the following descriptions in connection with the accompanying drawings, in which:

Fig. 1 is a pictorial representation of an airplane about to land on a highly directional homing beam;

Fig. 2 is a wiring diagram of our device showing a homing beam input to two identical independent circuits embodying visual indicators.

Numeral 1 indicates an airplane coming in on a highly directional homing beam 2. Antennae 3 and 4 are mounted on the wing tips of said plane. Highly directional transmitter 5 provides a radiant energy homing beam which centers along the landing strip center line 6.

Since our device embodies two identical circuits, port input and starboard input, which operate independently of each other, except for common B plus and filament voltage, it will be necessary to describe but one of said circuits, namely, the port input circuit. It is understood that the other circuit, the starboard input circuit, is designed and operates in the same way as the described port input circuit.

Dynamotor 7, comprising a high-voltage generator 8 driven by a low-voltage motor 9, which is supplied by battery 10, supplies the power demand of our invention. Fuse 23 and switch 24 control the current from said battery. Bypass filter capacitor 34 is connected across generator 8 in B plus circuit to filter out all D. C. ripple. Bypass capacitor 35 is connected across motor 9 in the input voltage circuit. Sensitivity control resistance 11 (potentiometer resistance), the plate circuit of triode 12, and the plate circuit of triode 13, are all connected in parallel across the output terminals of dynamotor 7. The sensitivity control resistance and cathode return circuits are connected to the negative dynamotor terminal through ground connections. It will be noted that cathode 14 is connected through ground to said dynamotor through cathode load resistor 15. The anodes of said tubes are connected to the positive terminal of said dynamotor. It will be noted that anode 16 is connected to the positive terminal of said dynamotor through plate load resistor 17. The plate circuit of triode 18, with relay 19 in series therewith, is connected across sensitivity control resistor 11. The cathode 20 is slidingly engaged with resistor 11 by means of sliding contact 21 thereby forming a potentiometer 22. Dropping resistor 28 takes care of that portion of the potential drop that has not been taken care of by the resistance of the potentiometer 22.

Fixed contact 25 of relay 19 is connected to the positive side of battery 10. Armature 26 of relay 19 is connected to ground through indicator lamp 27.

Antenna 3 is connected to the grid of triode 13 through signal input coupling capacitor 70. The necessary grid bias for triode 13 operation is developed by grounded grid leak resistor 29.

Plate 16 of triode 13 is connected to the grid of triode 12 through coupling capacitor 30. The necessary grid bias for triode 12 operation is developed by grounded grid leak resistor 31. Bypass condenser 32 is connected in parallel with cathode load resistor 15 to smooth out the pulsations in the plate current and tend to produce a steady cathode bias.

Cathode 14 is connected to the grid of triode 18 through coupling resistor 33.

The triode heating filaments are connected in series parallel arrangement across the battery input supply 10. One series bank of four filaments 36, 37, 38 and 39 are paralleled with another series bank of two filaments 40 and 41 and a dropping resistor 42.

Operation

Assuming that radio beam transmitter 5 is located on the landing field center line 6, at the point 0, and that the antennae 3 and 4 mounted on airplane 1 are fully in the beam, equal amounts of energy will be induced in said two antennae, with the result that the output currents from said antennae and their associated amplifiers will be equal. Under such conditions, the airplane is on the beam and both port and starboard indicators will be lighted.

Assuming now, however, that the position of the airplane 1 has shifted with respect to the beam 2, as when the plane is "off-course" (see Fig. 1), so that one antenna is in the beam and the other outside the beam. The antenna in the beam receives substantially more energy than the antenna outside the beam—the antenna outside the beam receiving little or no energy. It is evident that current will flow through one circuit, and none in the other. This will be indicated immediately by the port and starboard indicators. The starboard indicator being in the beam, as shown in Fig. 1, will be lighted, while the port indicator being outside the beam will be unlighted, thus apprising the pilot that his airplane is not completely on the beam, and that he must bank to the starboard side to center on the beam.

If now the antennae are repositioned in the beam, as by banking above, equal currents will flow again in both relays with the result that both the starboard and port indicators will be lighted, and the airplane will be back completely on the beam.

As heretofore stated, since our device includes two identical circuits, port and starboard, which operate independently of each other, we will describe the operation of one circuit only, namely, the port circuit, which follows.

The relatively weak signal is fed to the grid of the tube 13 (signal amplifier stage) where it is amplified in the plate circuit of said tube. The amplified output of this tube 13 is fed into the grid of tube 12 (cathode follower stage). When a positive signal is applied to the grid in this cathode follower stage, the rise in plate current through the cathode resistor 15 produces a greater voltage drop across it, making the cathode more positive. Likewise, a negative signal applied to the grid causes a decrease in the drop across said cathode resistor, making the cathode less positive. Thus, the voltage across the cathode resistor 15 "follows" the grid. In other words, the cathode follower output "follows" the grid input voltage without reversing the polarity. The by-pass condenser 32 connected across the cathode resistor 15 tends to smooth out the pulsations in the plate current and tends to produce a steady cathode bias. Thus, the cathode follower stage provides a stable positive going signal output, and eliminates practically all circuit noises.

The sensitivity control potentiometer 22 controls the positive voltage applied to the cathode 20 of the visual coder tube 18 and is so adjusted that with no signal input applied, the coder tube is biased just beyond cut-off. When the positive signal output of the cathode follower stage is applied to said positive biased grid of coder tube stage, the grid becomes more positive (or less negative) with respect to cathode 20 and said coder tube 18 then conducts.

When the coder tube 18 conducts, its plate circuit is energized, and relay switch 19 closes the circuit through port indicator lamp 27 thereby lighting the same. It is understood that the indicator lamp 27 will reproduce in blinker form any coded signals transmitted on the glide path beam.

In conclusion, it is to be understood that while the embodiment of the invention which has been described is to be preferred, changes may be made in the construction and arrangement of parts without departing from the spirit and scope of the appended claims.

The invention described herein may be manufactured and used by or for the Government of the United States of America for governmental purposes without the payment of any royalties thereon or therefor.

What is claimed is:

1. For use on a mobile vehicle, for example an aircraft, a homing indicator for installation on said vehicle, being responsive to an external directional beam of radiant energy which said vehicle is adapted to confront, said indicator comprising spaced antennae, identical networks with which the antennae are connected, each network including a signal amplifier, means for converting positive and negative signal impulses into a stable signal output of uniform polarity said means consisting of a cathode follower connected to the amplifier, thermionic means operable by said follower consisting of a triode with a grid initially biased beyond cut-off but responding with current conduction when impressed with said signal output, an electrical indicator means, and a relay switch controlling a source of current through the indicator means, being connected with said triode and operable by said current conduction to energize said indicator means.

2. For use on a mobile vehicle having a pair of spaced antennae responsive to an external directional beam of radiant energy which said vehicle is adapted to confront, a homing indicator adapted for connection to each of said antennae and comprising a signal amplifier stage, means connected to said stage for converting the output thereof into a stable signal of uniform polarity, indicating means, switch means for controlling the operation of said indicating means, and thermionic means connected to the output of said converting means for actuating said switch means when said stable signal attains a predetermined amplitude.

3. A homing indicator for a mobile craft having a pair of spaced antennae responsive to an external directional beam of radiant energy which said craft is adapted to confront, said indicator comprising a signal amplifier adapted to be connected to each of said antennae, a cathode follower having its input end connected to the output of said amplifier, indicator means, switch means for controlling the operation of said indicator means, and thermionic means connected to the output of said follower for actuating said switch means when the output of said follower attains a predetermined amplitude.

4. A homing indicator for a mobile vehicle having a pair of spaced antennae responsive to an external directional beam of radiant energy which said vehicle is adapted to confront, said indicator comprising a cathode follower adapted to be connected to each of said antennae to produce a stable signal output of uniform polarity, indicator means, relay means for actuating said indicator means, and thermionic means connected to the output of said follower for actuating said relay means when said signal output attains a predetermined output.

WALDO S. CATES.
CLYDE W. HAMMOND.

REFERENCES CITED

The following references are of record in the file of this patent:

UNITED STATES PATENTS

| Number | Name | Date |
| --- | --- | --- |
| 1,960,297 | Chapman | May 29, 1934 |
| 2,036,187 | Chromy | Apr. 7, 1936 |
| 2,040,734 | Gallagher | May 12, 1936 |
| 2,196,139 | Carlson | Apr. 2, 1940 |
| 2,202,552 | Heller | May 28, 1940 |
| 2,216,708 | Kolster | Oct. 1, 1940 |
| 2,284,812 | Gage | June 2, 1942 |

FOREIGN PATENTS

| Number | Country | Date |
| --- | --- | --- |
| 524,526 | Great Britain | Aug. 8, 1940 |